United States Patent
Kawabe et al.

[11] Patent Number: 6,052,255
[45] Date of Patent: Apr. 18, 2000

[54] MAGNETIC DISK UNIT HAVING ANTI-IMPACT ARRANGEMENT

[75] Inventors: Yoshiko Kawabe, Ibaraki; Shinobu Yoshida, Tsuchiura; Yasuhiro Matsuda; Hiroshi Ikeda, both of Ibaraki; Isao Shimizu, Ishioka; Tsuyoshi Takahashi, Odawara, all of Japan

[73] Assignee: Hitachi, Ltd., Tokyo, Japan

[21] Appl. No.: 08/648,184

[22] PCT Filed: Oct. 5, 1995

[86] PCT No.: PCT/JP95/02038

§ 371 Date: May 20, 1996

§ 102(e) Date: May 20, 1996

[87] PCT Pub. No.: WO96/11474

PCT Pub. Date: Apr. 18, 1996

[30] Foreign Application Priority Data

Oct. 6, 1994 [JP] Japan .................................. 6-242613

[51] Int. Cl.$^7$ .................................................. G11B 33/14
[52] U.S. Cl. ........................................................ 360/97.02
[58] Field of Search ............................. 360/97.01–97.03; 369/247, 258

[56] References Cited

U.S. PATENT DOCUMENTS

| | | | |
|---|---|---|---|
| 4,712,146 | 12/1987 | Moon et al. | 360/97.01 |
| 4,980,786 | 12/1990 | O'Sullivan et al. | 360/97.03 |
| 5,079,655 | 1/1992 | Yagi | 360/97.02 |
| 5,097,978 | 3/1992 | Eckerd | 360/97.02 |
| 5,187,621 | 2/1993 | Tacklind | 360/97.02 |
| 5,223,996 | 6/1993 | Read et al. | 360/97.02 |
| 5,233,491 | 8/1993 | Kadonaga | 360/97.02 |
| 5,270,887 | 12/1993 | Edwards et al. | 360/97.03 |
| 5,339,204 | 8/1994 | James et al. | 360/97.03 |
| 5,366,200 | 11/1994 | Scura | 360/97.02 |
| 5,469,311 | 11/1995 | Nishida et al. | 360/97.02 |
| 5,483,398 | 1/1996 | Boutaghou | 360/97.02 |
| 5,546,250 | 8/1996 | Diel | 360/97.02 |
| 5,587,855 | 12/1996 | Kim | 360/97.02 |
| 5,703,734 | 12/1997 | Berberich et al. | 360/97.02 |

FOREIGN PATENT DOCUMENTS

| | | |
|---|---|---|
| 0 307 136 A2 | 3/1989 | European Pat. Off. . |
| 0 381 408 A1 | 8/1990 | European Pat. Off. . |
| 0 428 291 A2 | 5/1991 | European Pat. Off. . |
| 41 10 399 A1 | 10/1992 | Germany . |
| 63-211192 | 9/1988 | Japan .................................. 360/97.02 |
| 2-249192 | 10/1990 | Japan .................................. 360/97.02 |
| 2 245 408 | 1/1992 | United Kingdom . |
| WO 90/05982 | 5/1990 | WIPO . |

OTHER PUBLICATIONS

Japanese Patent Unexamined Publication No. 5–258545.
Japanese Patent Unexamined Publication No. 4–368690.
Japanese Patent Unexamined Publication No. 6–236668.
Japanese Patent Unexamined Publication No. 5–109257.
Japanese Patent Unexamined Publication No. 55–135379.
Japanese Utility Model Unexamined Publication No. 5–86196.
Japanese Utility Model Unexamined Publication No. 1–133274.

*Primary Examiner*—Brian E. Miller
*Attorney, Agent, or Firm*—Antonelli, Terry, Stout & Kraus, LLP

[57] ABSTRACT

A magnetic disk unit is provided which can protect internal mechanisms from external force. A cover 11 covers the outer periphery of a base 12 which supports a spindle mechanism 2 and a head positioning mechanism 5. The cover 11 is connected to the base 12 elastically to reduce the possibility that the external force directly acts on the base and to assure that the external force acting on the cover is transmitted to the base via a cushioning material, whereby the spindle mechanism and the head positioning mechanism are protected from the external force.

15 Claims, 12 Drawing Sheets

MAGNETIC DISK UNIT HAVING ANTI-IMPACT ARRANGEMENT

TECHNICAL FIELD

The present invention relates to a magnetic disk unit and, in particular, to a portable and compact magnetic disk unit that can be detached from an information processing apparatus and carried.

BACKGROUND ART

To make a magnetic disk unit compact and thinned so that it may be used as a portable and exchangeable storage medium, an internal spindle mechanism, a magnetic head positioning mechanism and so on must be protected from impacts that result from falls or the like of the magnetic disk unit.

For example, Japanese Unexamination Patent Publication No. 5-258545 discloses a magnetic disk unit in which a viscous member is sandwiched between a base and a top plate to absorb vibrations of its cover. However, the disclosure fails to propose any solution to avoid an adverse effect caused to a spindle motor and a head positioner by impacts exerted to the base plate.

Further, Japanese Unexamination Patent Publication No. 4-368690 discloses a magnetic disk unit in which the four external corners of the case of the unit are provided with elastic members so as to weaken impacts caused when the unit falls and hits against a floor. However, the disclosure has proposed no solution to cope with impacts exerted to the unit at its portions other than the four corners.

DISCLOSURE OF THE INVENTION

As described above, the prior art magnetic disk unit lacks solutions to protect the spindle motor, the head positioner and so on from impacts which are frequently exerted in horizontal directions to the portable and compact magnetic disk unit when it is handled during carrying or from impacts exerted to the magnetic disk unit when it is placed on a desk top.

Accordingly, it is an object of the present invention to provide a magnetic disk unit that is capable of protecting internal mechanisms from impacts exerted in a wider range of directions.

It is another object of the present invention to provide a magnetic disk unit that is capable of weakening the impact that acts on the base to thereby protect internal mechanisms such as a spindle mechanism and a head positioning mechanism mounted on a base.

It is a further object of the present invention to provide a thin type magnetic disk unit that is capable of protecting its internal mechanisms against fall and collision.

According to the first aspect of the invention, there is provided a magnetic disk unit comprising a spindle mechanism for rotating a magnetic disk, a head positioning mechanism for positioning a magnetic head by shifting said magnetic head along a recording surface of said magnetic disk, a base supporting said spindle mechanism and said head positioning mechanism, and a cover that covers in a non-contacting relationship said spindle mechanism and said head positioning mechanism supported on said base, wherein the joint portion of the cover and the base is structured such that the lower edge portion of said cover extends downward beyond the level of the underside of said base to cover the outer peripheral edge of said base in a non-contacting relationship thereto and said cover and said base are connected together in the inner portion of said cover with a cushioning material interposed therebetween.

According to the second aspect of the invention, there is provided a magnetic disk unit comprising a spindle mechanism for rotating a magnetic disk, a head positioning mechanism for positioning a magnetic head by shifting said magnetic head along a recording surface of said magnetic disk, a base supporting said spindle mechanism and said head positioning mechanism, and a cover that covers in a non-contacting relationship said spindle mechanism and said head positioning mechanism supported on said base, wherein said head positioning mechanism supports said magnetic head such that said magnetic head is movable in a space between said magnetic disk and said base, the joint portion of the cover and the base is structured such that the lower edge portion of said cover extends downward beyond the level of the underside of said base to cover the outer peripheral edge of said base in a non-contacting relationship thereto and said cover and said base are connected together in the inner portion of said cover with a cushioning material interposed therebetween.

According to the third aspect of the invention, there is provided a magnetic disk unit comprising a spindle mechanism for rotating a magnetic disk, a head positioning mechanism for positioning a magnetic head by shifting said magnetic head along a recording surface of said magnetic disk, a base supporting said spindle mechanism and said head positioning mechanism, and a cover that covers in a non-contacting relationship said spindle mechanism and said head positioning mechanism supported on said base, wherein the joint portion of the cover and the base is structured such that the lower edge portion of said cover extends downward beyond the level of the underside of said base to cover the outer peripheral edge of said base in a non-contacting relationship thereto and said cover and said base are connected together in the inner portion of said cover with a cushioning material interposed therebetween, and said base is provided with openings in its inner corners along the outlines thereof.

Since the cover extends to cover the outer peripheral edge of the base, the possibility that an external force is directly applied to the base is reduced. Since the external force that acts on the cover is transmitted to the base via a cushioning material (cushioning structure), undue external force is prevented from acting on the spindle mechanism and the head positioning mechanism, whereby dislocation is avoided.

BRIEF DESCRIPTION OF THE DRAWINGS

FIG. 19 is an exploded perspective view of the magnetic disk unit according to an eleventh embodiment of the present invention while

BEST MODES FOR CARRYING OUT THE INVENTION

Figure 1:
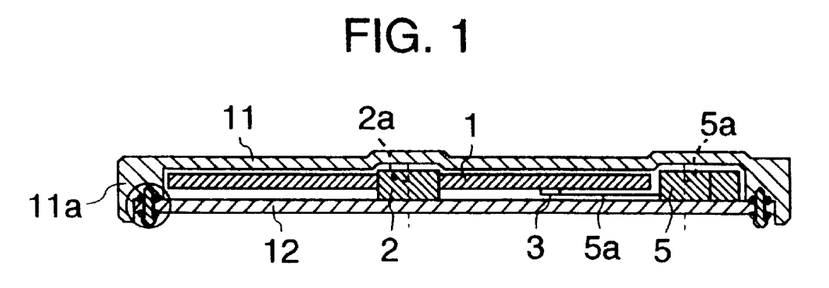
FIG. 1 is a longitudinal sectional side view of the magnetic disk unit according to a first embodiment of the present invention.
Figure 2:
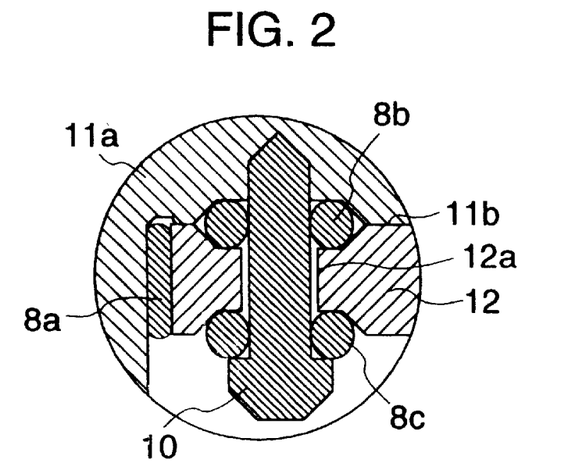
FIG. 2 is an enlarged view of a part of FIG. 1.
Figure 3:
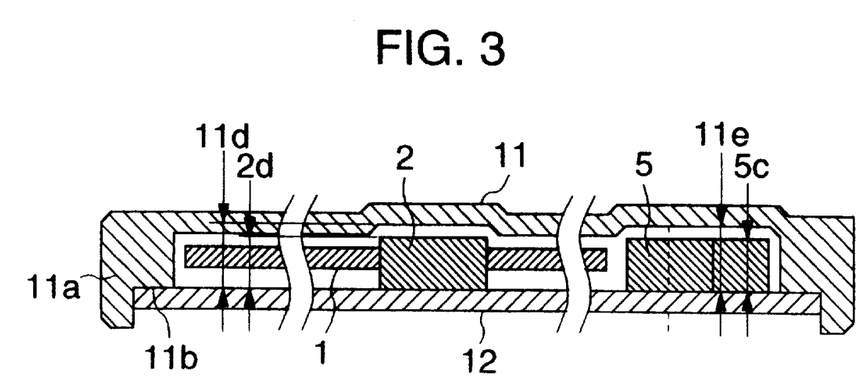
FIG. 3 is an enlarged view showing dimensional relation of the magnetic disk unit shown in FIG. 1.

FIGS. 1 through 3 show the first embodiment of the present invention, wherein FIG. 1 is a longitudinal sectional side view of the magnetic disk unit, FIG. 2 is an enlarged view of a part thereof, and FIG. 3 is an enlarged view showing dimensional relationship thereof.

A spindle mechanism 2 with a magnetic disk 1 mounted thereon is fixed to an upper surface of a base 12 made of a stainless steel sheet. The spindle mechanism 2 rotates the magnetic disk 1 about a spindle center axis 2a.

A head positioning mechanism 5 has, on the end of its suspension arm 5a, a magnetic head 3 which reads information from or writes information on the recording surface of the magnetic disk 1 and is mounted on the upper surface of the base 12. Furthermore, the head positioning mechanism 5 is pivoted about its axis of rotation 5b so that the magnetic head 3 moves in the space formed between the magnetic disk 1 and the base 12 and along the recording surface formed on the underside of the magnetic disk 1.

A cover 11 made of aluminum having a lower edge portion 11a which is slightly larger than the peripheral edge of the base 12 is provided with an upwardly offset stepped surface 11b inward of the lower edge portion of the cover 11. The base 12 has its outer peripheral edge fixed to the stepped surface 11b. A space is provided between the outer peripheral edge of the base 12 and the inner peripheral face of the lower edge portion 11a of the cover 11 to accommodate a cushioning material 8a made of rubber, and a bolt-connection to the stepped surface 11b is made through rubber cushioning materials 8b, 8c interposed therebetween. The diameters of bolt holes 12a formed in the base 12 are larger than the outer diameters of the bolts 10 which extend therethrough and are screwed into the stepped surface 11b, so that the bolts are in non-contacting relation to the base. The cushioning material 8b is sized to leave a small clearance between the stepped surface 11b of the cover 11 and the base 12 when the bolts 10 are tightened at a predetermined force to secure the base 12 to a part of the cover 11 inward of the lower edge portion 11a of the cover 11, so that any impact acting on the cover 11 is prevented from being directly transmitted to the base 12. With the stepped surface 11b of the cover 11 being taken as a reference level, the cover 11 is internally dimensioned such that a cover portion adjacent the spindle mechanism 2 mounted on the base 12 is of a level 11d that is higher than the height 2b of the spindle mechanism 2, another cover portion adjacent the head positioning mechanism 5 mounted on the base 12 is of a level 11e that is higher than the height 5c of the head positioning mechanism 5, whereby the spindle mechanism 2 including the magnetic disk 1 and the head positioning mechanism 5 do not contact the cover 11.

Since, according to the magnetic disk unit thus constructed, the cover 11 covers the spindle mechanism 2 and head positioning mechanism 5 mounted on the base 12 and the outer peripheral edge of the base 12 and further extends downward beyond the base 12, collision of the spindle mechanism 2 or the head positioning mechanism 5 when the unit falls or is transported is prevented, and the chance of collision of the base 12 is decreased. Since spaces or cushioning materials 8a through 8c are interposed, respectively, between the spindle mechanism 2 and the head positioning mechanism 5, and between the base 12 that supports both the spindle mechanism 2 and head positioning mechanism 5 and the cover 11, any impact exerted to the cover 11 will not be directly transmitted to the spindle mechanism 2 and head positioning mechanism 5, so that they are protected against such impact.

Figure 4:
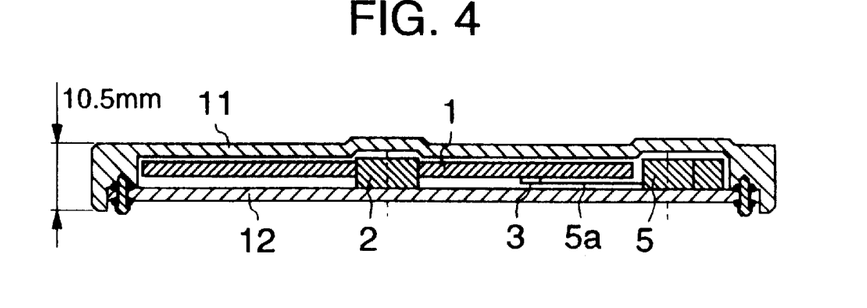
FIG. 4 is a longitudinal sectional side view of the magnetic disk unit according to a second embodiment of the present invention.
Figure 5:
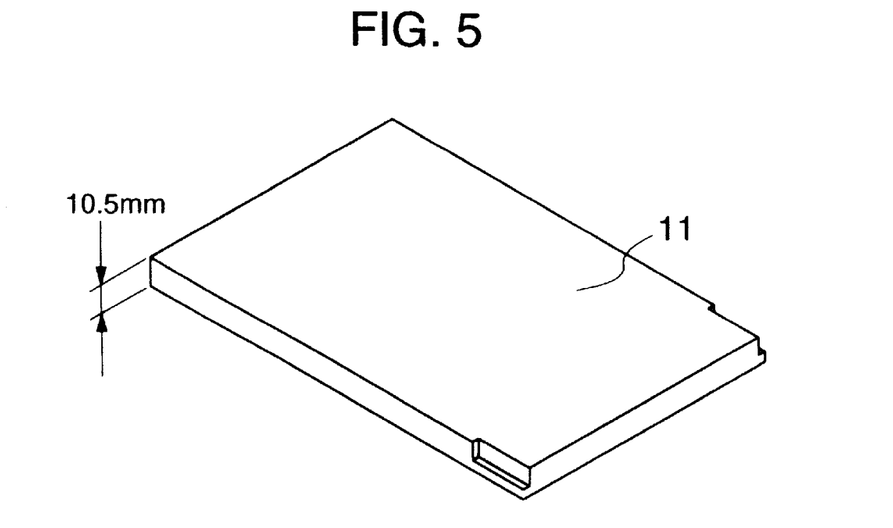
FIG. 5 is a perspective view of the outline of the magnetic disk unit shown in FIG. 4.

FIGS. 4 and 5 show the second embodiment of the present invention. FIG. 4 is a longitudinal sectional side view of the magnetic disk unit, and FIG. 5 is a perspective view of the outline thereof. In comparison with the above-described magnetic disk unit of the first embodiment, the feature of this embodiment lies in the dimension of the overall thickness of the unit being 10.5 mm (or less) to meet the type III standard of IC memory card. The rest of the construction remains unchanged from the first embodiment, so that any further description is omitted.

The magnetic disk unit of such dimensions allows the prior art information processing apparatus using an IC memory card as an external memory device to be easily modified to be for use with the magnetic disk unit, so that an information processing apparatus may also be so constructed as to be compatible with both the IC memory card and the magnetic disk unit.

The above dimensions may be implemented into the preceding embodiment and third to eleventh embodiments to be described later, as well.

Figure 6:
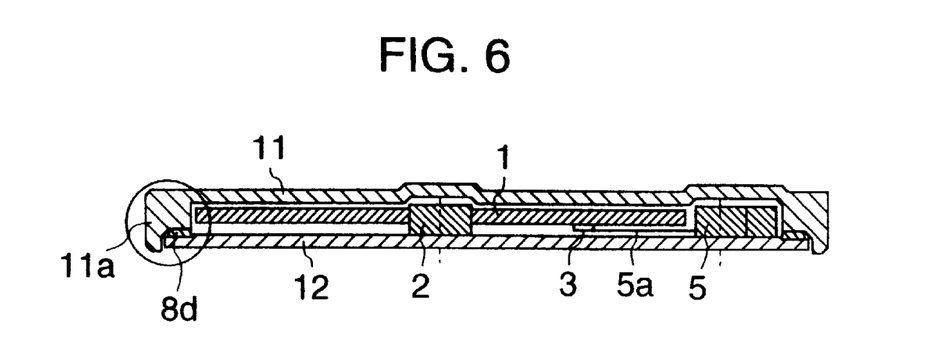
FIG. 6 is a longitudinal sectional side view of the magnetic disk unit according to a third embodiment of the present invention.
Figure 7:
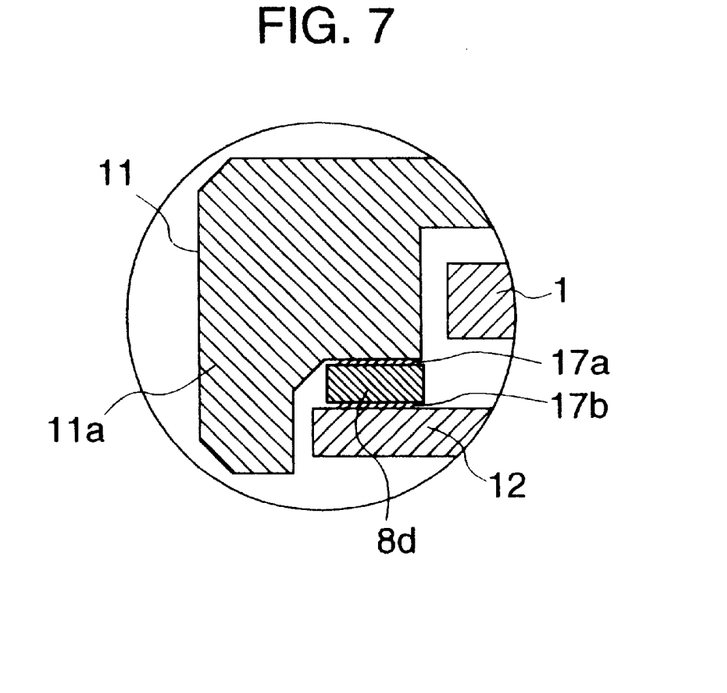
FIG. 7 is an enlarged view of a part of FIG. 6.

FIGS. 6 and 7 show the third embodiment of the invention. FIG. 6 is a longitudinal sectional side view of the magnetic disk unit and FIG. 7 is an enlarged view of a part thereof. Those components of the embodiment identical or equivalent to those described with reference to the first embodiment are designated by the same reference numerals so as to save detailed explanation thereof.

In comparison with the first embodiment already described, the feature of this embodiment is that the joint between the cover 11 and the base 12 is achieved by adhesives 17a, 17b on both sides of the cushioning material 8d disposed between the cover 11 and the base 12.

This embodiment is characterized in that the cushioning and joining between the cover 11 and the base can be realized by a small number of component parts and by a simple joining operation. Such a joint structure using the adhesive may be applied to any of the first and second embodiments, as well as to any of the fourth to twelfth embodiments to be described later.

Figure 8:
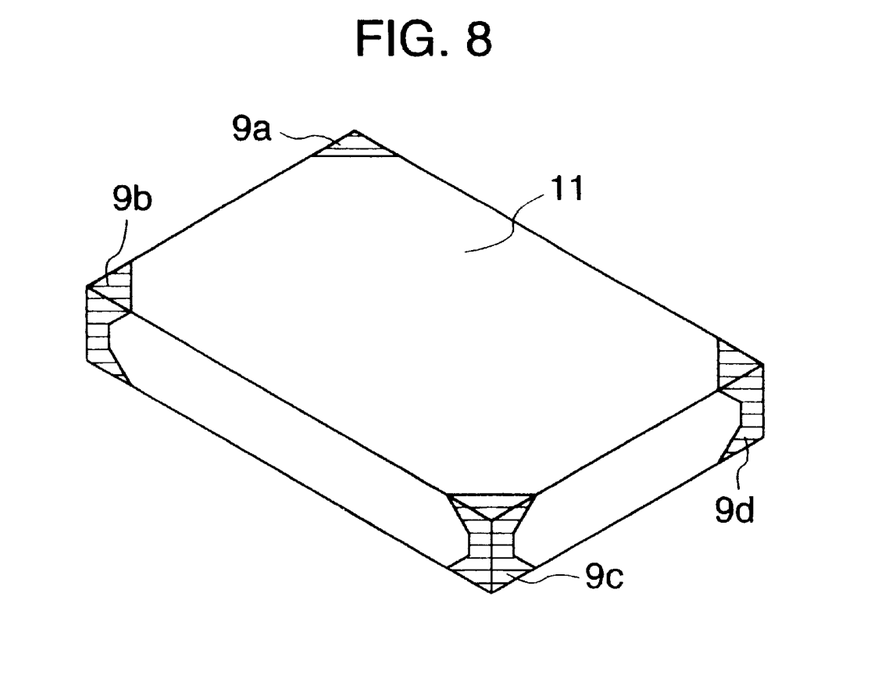
FIG. 8 is a perspective view of the outline of the magnetic disk unit according to a fourth embodiment of the present invention.

FIG. 8 is a perspective view of the magnetic disk unit according to the fourth embodiment of the present invention. The feature of this embodiment is that the cover 11 is made of a plastic material with shock absorbers 9a through 9d bonded to the corners of the cover 11. This embodiment may be applied to any of the first to third embodiments and any of the fifth to twelfth embodiments by modification.

According to this embodiment, the cover 11 can be manufactured by plastic molding at low costs to achieve reduction in manufacturing cost and in weight. Furthermore, since the corners of the unit that are subject to impacts when the unit is carried or falls are protected by the shock absorbers 9a through 9d, the weakening of impacts and prevention of damage are achieved to increase the reliability of the unit.

Figure 9:
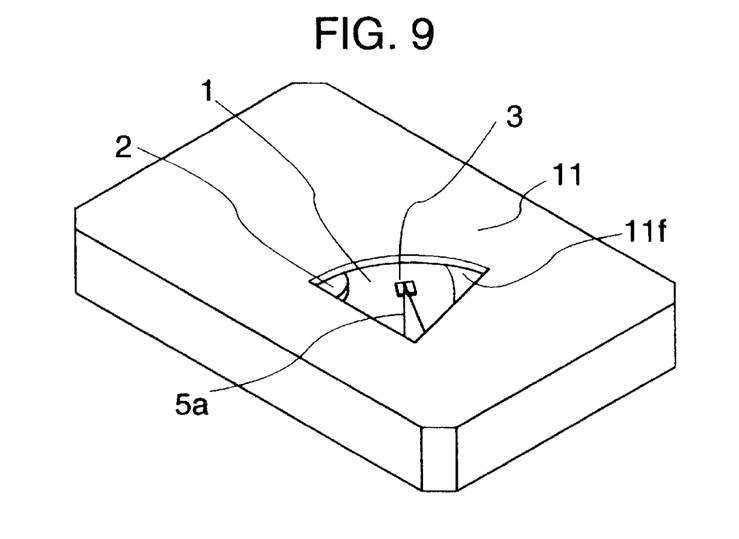
FIG. 9 is a perspective view of the outline of the magnetic disk unit according to a fifth embodiment of the present invention.

FIG. 9 is the perspective view of the magnetic disk unit according to the fifth embodiment of the present invention. In comparison with each of the preceding embodiments, the feature of this embodiment is that the cover 11 of a molded plastic has a viewing window 11f in an area opposed to the range of pivotal motion of the suspension arm 5a and the magnetic head 3 so that the conditions of the magnetic disk 1, magnetic head 3 and suspension arm 5a can be viewed from outside. The viewing window 11f is fan-shaped and formed of a transparent material. This embodiment is applicable to any of the already described embodiments by modification. The modification must include a structure that the magnetic head 3 and the suspension arm 5a are disposed in the space between the magnetic disk 1 and the cover 11 to allow the magnetic head 3 and the suspension arm 5a to be viewed from outside the cover 11.

In order that the magnetic head 3 and the suspension arm 5a disposed in the space between the magnetic disk 1 and the base may be viewed, a similar viewing window may be formed in the base 12.

This embodiment may be applied to any of the sixth to twelfth embodiments to be described later.

Figure 10:
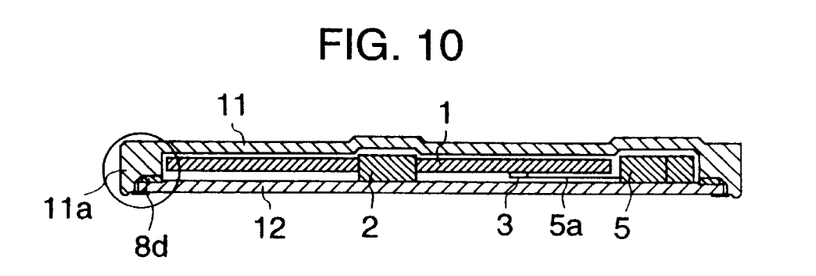
FIG. 10 is a longitudinal sectional side view of the magnetic disk unit according to a sixth embodiment of the present invention.
Figure 11:
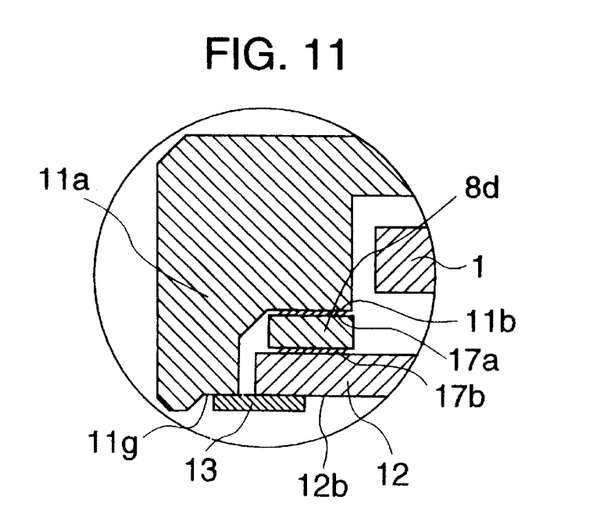
FIG. 11 is an enlarged view of a part of FIG. 10.

FIGS. 10 and 11 show the seventh embodiment of the present invention. FIG. 10 is a longitudinal sectional side view of the magnetic disk unit, and FIG. 11 is a enlarged view thereof. In this embodiment, on its lower end, the lower edge portion 11a described with reference to the third embodiment is provided with a seal application area 11g which is recessed to the level flush with the underside 12b of the base 12 so that the clearance between the cover 11 and the base 12 can be sealingly closed by a sealing tape 13 adhesively applied to the seal application area 11g and the underside 12b of the outer peripheral portion of the base 12.

The joining and sealing between the cover 11 and the base 12 achieved by adhesive advantageously reduce the number of the component parts and the manufacturing steps for joining operation.

The sealed structure using the sealing tape 13 may be applied to any of the first, second, fourth and fifth embodiments already described and to any of the seventh to twelfth embodiments to be described later.

Figure 12:
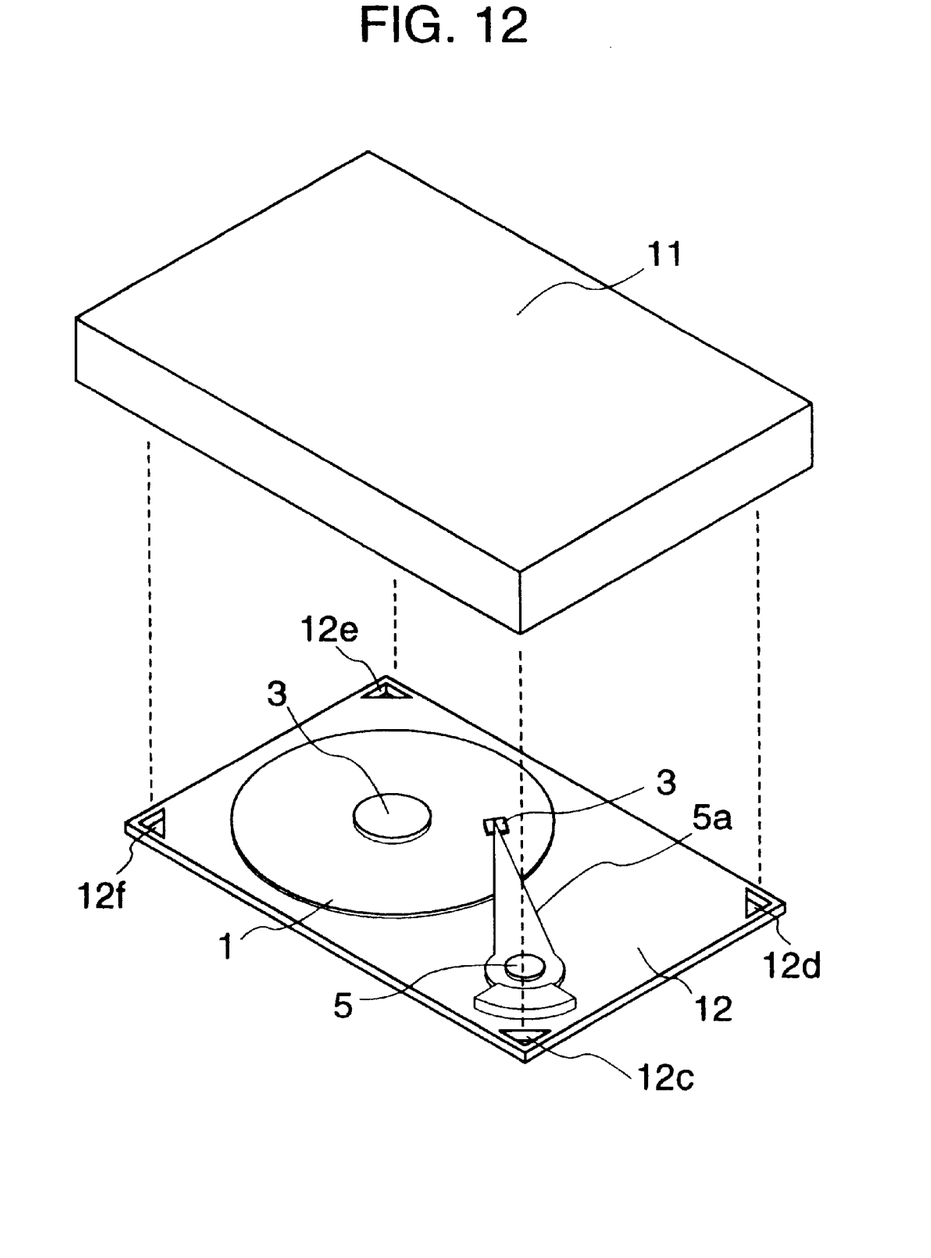
FIG. 12 is an exploded perspective view of the magnetic disk unit according to a seventh embodiment of the present invention.
Figure 13:
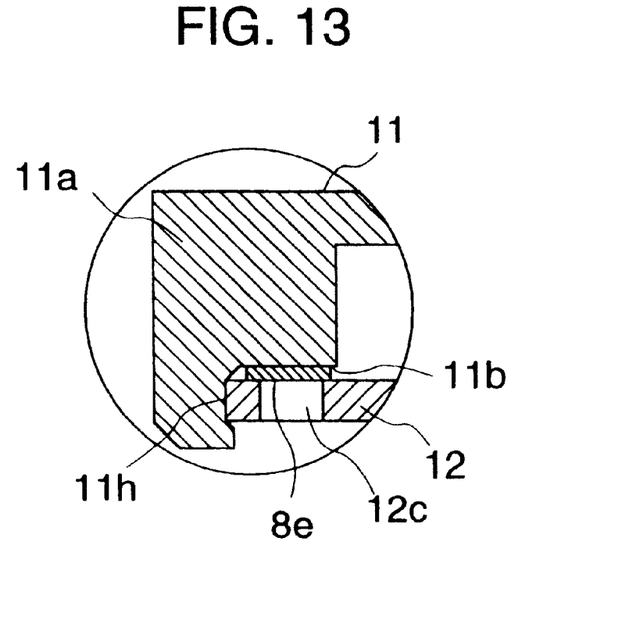
FIG. 13 is an enlarged view showing an example of the joint portion of the embodiment shown in FIG. 12.
Figure 14:
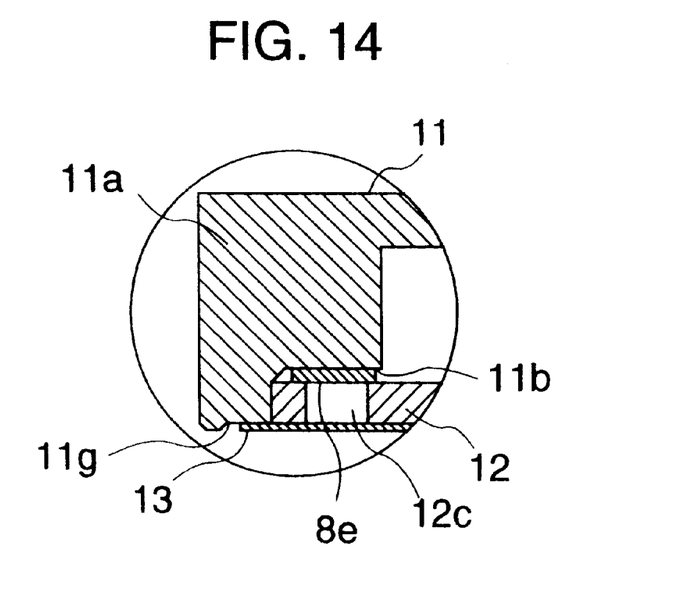
FIG. 14 is an enlarged view showing another example of the joint portion of the embodiment shown in FIG. 12.

FIGS. 12 through 14 show the seventh embodiment of the present invention. FIG. 12 is an exploded perspective view of the magnetic disk unit and FIGS. 13 and 14 are enlarged cross-sectional views.

The feature of this embodiment is that the base 12 and the cover 11 are joined by elastically deforming the corners of the base 12 into engagement with the inside of the lower edge portion 11a of the cover 11. The corners of the base 12 have openings 12c through 12f formed along the corner outlines, so that the peripheries of the corners that define the openings 12c through 12f can be elastically deformed into engagement with the inside of the lower edge portion 11a of the cover 11.

In the joint structure shown in FIG. 13, elastic deformation is made of the corners of the base 12 so that a recess 11h formed in the inner wall that extends downward from the stepped surface 11b of the lower edge portion 11a of the cover 11 receives the thus deformed corners of the base 12. Opening 12c for imparting elasticity to a corner of the base 12 is, in its engaged state, sealed by a cushioning material 8e interposed between the stepped surface 11b of the cover 11 and the base 12.

In the joint structure shown in FIG. 14, the under surface of the lower edge portion 11a is provided with a seal application area 11g that is recessed to the level flush with the underside 12b of the base 12 so that a sealing tape 13 can be applied to the seal application area 11g and the underside 12b of the outer periphery of the base 12 to close the opening 12c to assure that the cover 11 and the base 12 are prevented from being dislodged and sealing is achieved.

The joining by the engagement that is achieved by the elastic deformation of the corners of the base 12 where the openings 12c through 12f are formed is effective to reduce the transmission of an impact acting on the cover 11 to the base 12 as well as to decrease the number of the component parts and the manufacturing steps for the joining operation.

Figure 15:
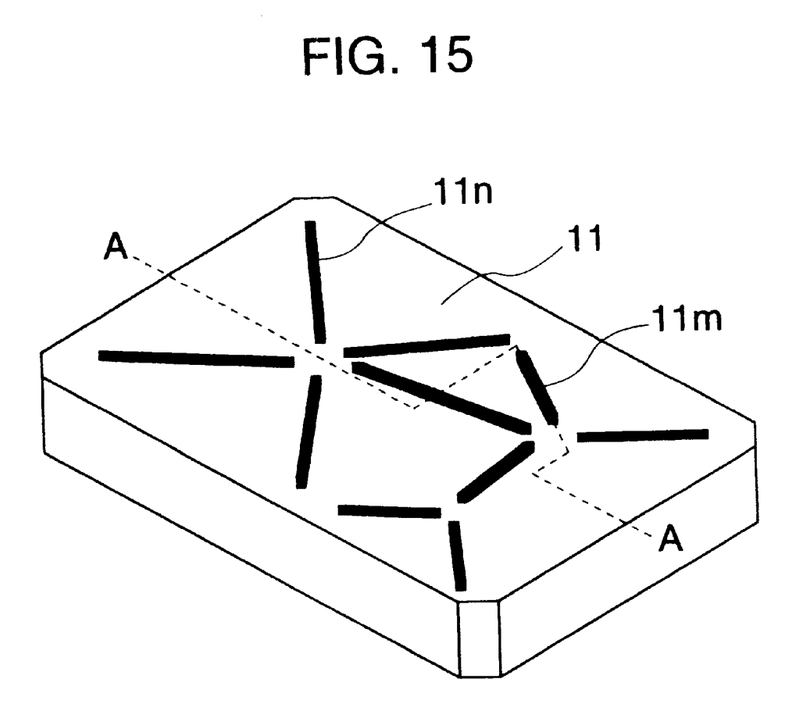
FIG. 15 is a perspective view of the outline of the magnetic disk unit according to an eighth embodiment of the present invention.
Figure 16:
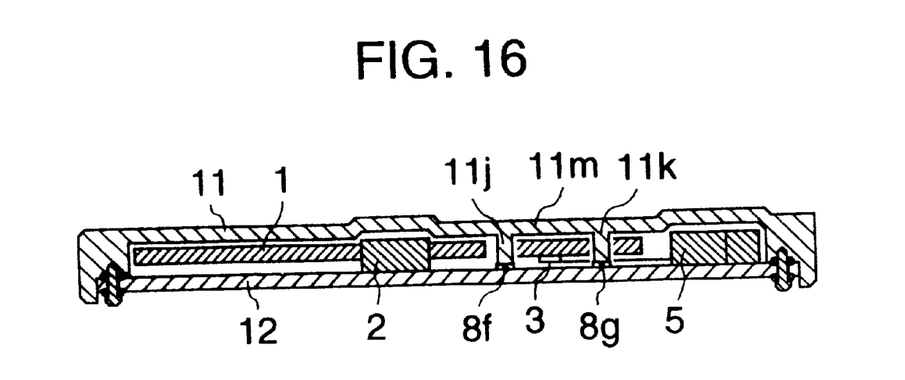
FIG. 16 is a sectional view along line A—A in FIG. 15.

FIGS. 15 and 16 show the eighth embodiment of the present invention. FIG. 15 is a perspective view, and FIG. 16 is a longitudinal sectional view taken along line A—A in FIG. 15. The feature of this embodiment is that the cover 11 of the already described first embodiment is modified so that posts 11j, 11k extend therefrom toward the base 12 with elastic members 8f, 8g applied to the ends of the posts and ribs 11m, 11n are formed to extend radially from the positions of the posts 11j, 11k to decrease the deflection of the cover 11.

The cover 11 in this embodiment can be formed by plastic molding. The elastic members 8f, 8g are bonded to the ends of the posts 11j, 11k. When the cover 11 and the base 12 are in their assembled state, the elastic members 8f, 8g contact the base 12 to form elastic spacer members. As for the joint structure, any structure described with reference to each of the preceding embodiments and embodiments to be described later may be employed.

In the magnetic disk unit thus constructed, external force applied to the cover 11 when the unit is carried is absorbed by means of the rigidity of the ribs 11m and 11n and deformation of the elastic members 8f, 8g caused by the posts 11j, 11k, so that the amount of deflection of the cover 11 can be minimized. Even when a relatively large external force is exerted to the cover 11, therefore, the cover 11 can be prevented from being deflected into interfering engagement with the spindle mechanism 2 and with the head positioning mechanism 5.

The posts 11j, 11k, the spacers formed by the elastic members 8f, 8g and the rigidity reinforcements by the ribs 11*m*, 11*n* employed in this embodiment may be applied to any of the other embodiments.

Figure 17:
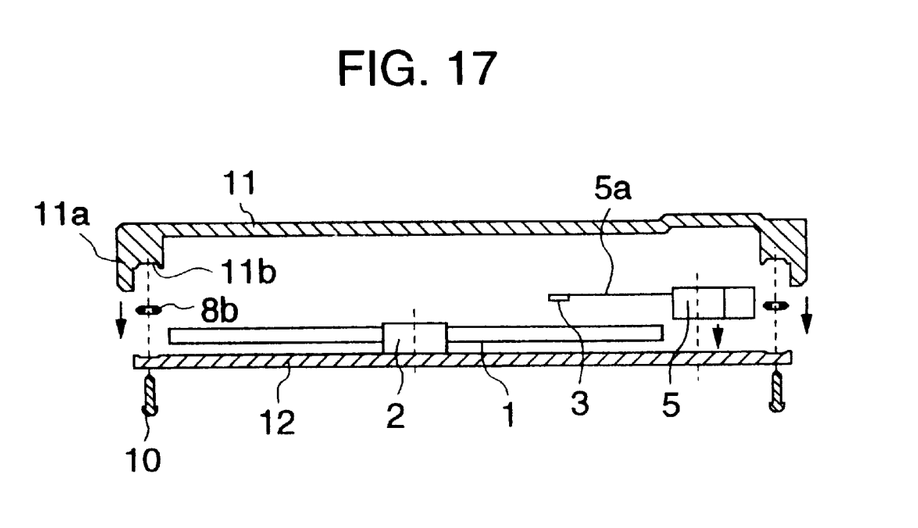
FIG. 17 is a longitudinal sectional side view showing the assembly process of the magnetic disk unit according to a ninth embodiment of the present invention.

FIG. 17 is a longitudinal sectional side view showing the assembly process of the magnetic disk unit according to the ninth embodiment of the present invention. In this embodiment, the magnetic disk unit has a magnetic disk 1 whose top surface is formed as a recording surface. A spindle mechanism 2 which rotates a magnetic disk 1 is mounted on a base 12 first, and then a head positioning mechanism 5 is assembled. A cover 11 is then mounted on the base 12 to cover the spindle mechanism 2 and the head positioning mechanism 5 which have already been attached to the base. Then, bolts 10 are tightened to secure the members together with the cushioning materials 8*b* interposed between the stepped surface 11*b* of the lower edge portion 11*a* and the base 12.

Figure 18:
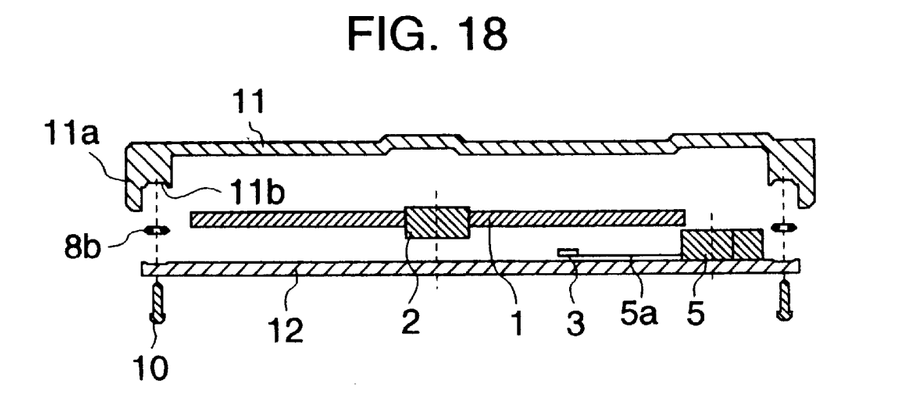
FIG. 18 is a longitudinal sectional side view showing the assembly process of the magnetic disk unit according to a tenth embodiment of the present invention.

FIG. 18 is a longitudinal sectional side view showing the assembly process of the magnetic disk unit according to the tenth embodiment of the present invention. In this embodiment, the magnetic disk unit has a magnetic disk 1 whose bottom surface is formed as a recording surface. A head positioning mechanism 5 is first mounted on a base 12, and then a spindle mechanism 2 which rotates the magnetic disk 1 is mounted on the base 12. A cover 11 is then mounted on the base 12 to cover the spindle mechanism 2 and the head positioning mechanism 5 which have already been attached to the base. Then, bolts 10 are tightened to secure the members together with a cushioning material 8*b* interposed between the stepped surface 11*b* of the lower edge portion 11*a* and the base 12.

Figure 19:
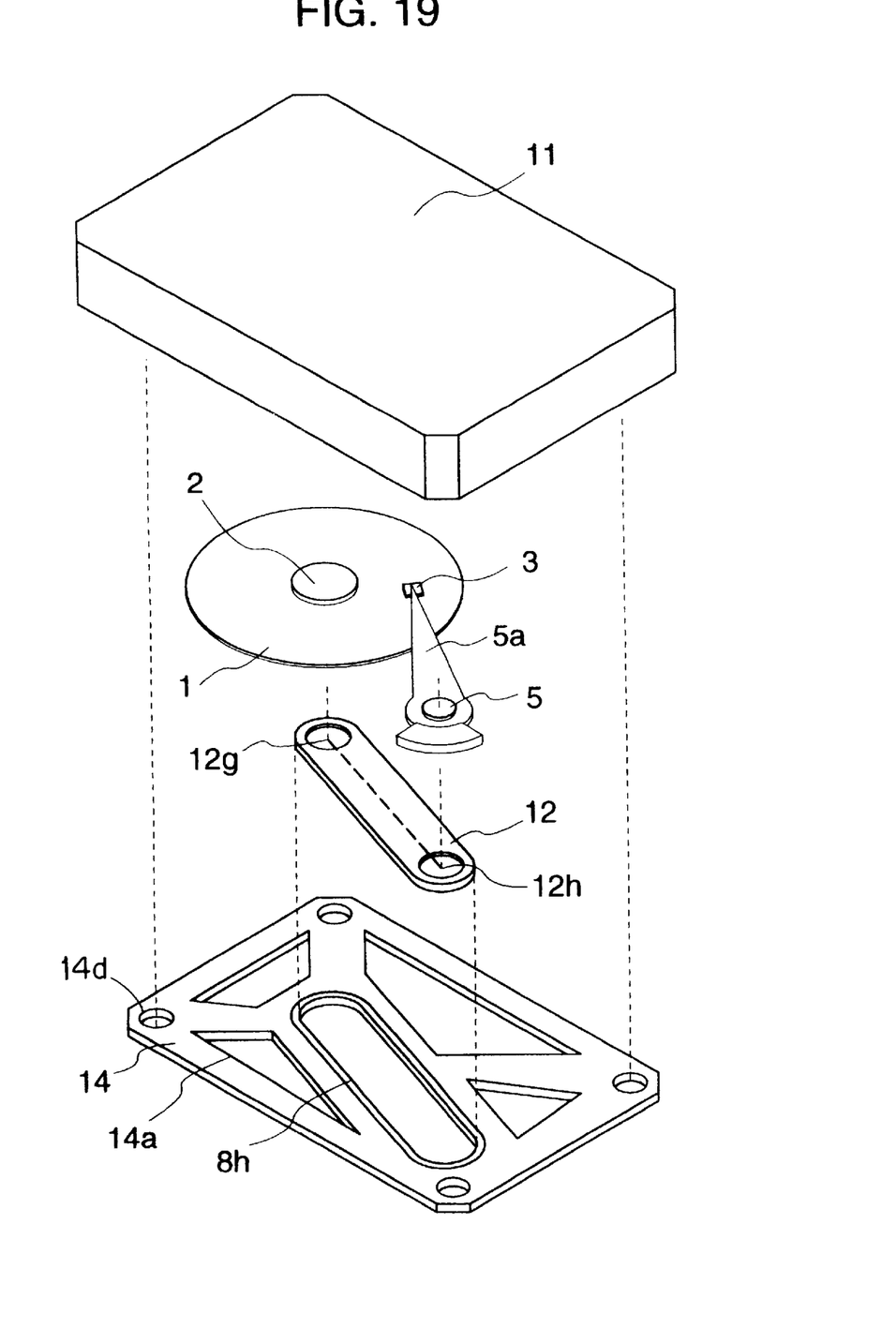
Figure 19A:
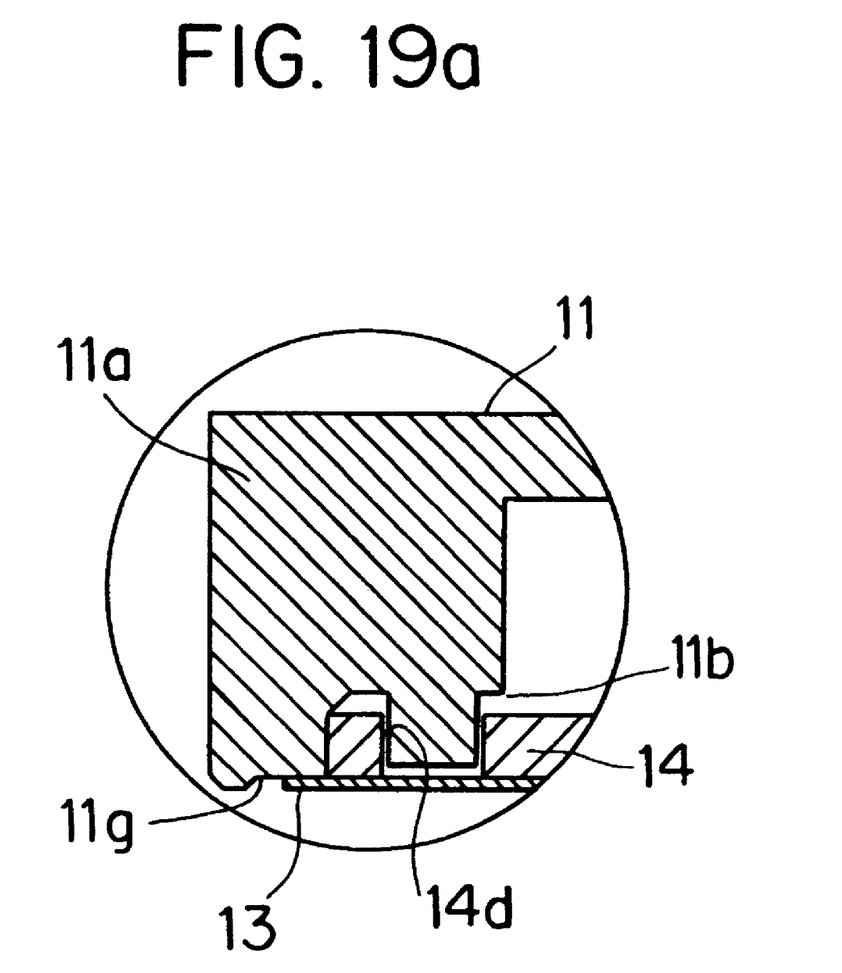
FIG. 19a is a cross-sectional view of a portion of such embodiment.

FIG. 19 is an exploded perspective view of the magnetic disk unit according to the eleventh embodiment of the present invention, while FIG. 19*a* is a cross-sectional view of a portion of such embodiment. In this embodiment, a base 12 is in the form of an oblong plate having a spindle mechanism seating section 12*g* on one end and a head positioning mechanism seating section 12*h* on the other end with a line extending between both seating sections included within the base 12. A spindle mechanism 2 and a head positioning mechanism 4 are mounted on the spindle mechanism seating section 12*g* and the head positioning mechanism seating section 12*h*, respectively. The base 12 is secured to a plastic base retaining plate 14 via a cushioning material 8*h*. The base 12 is then connected to the inside of a lower edge portion 11*a* of a plastic cover 11. The base retaining plate 14 is of a rigidity-reinforced structure having embossed portions 14*a* and openings 14*d* defining plastically deformable base portions which are plastically deformed so as to engage portions of the impact cover to lock them together.

In the magnetic disk unit thus constructed, any impact exerted to the cover 11 is absorbed by deflections of the cover 11 and the base retaining plate 14 and the cushioning material 8*h*, so that the base 12 can be protected against deformation. The cover 11 has a downward extending portion 11*g* (FIG. 19*a*) extending downward below a level of an underside of the base retaining plate 14. A seal 13 is also provided. Relative displacement between the spindle mechanism 2 and the head positioning mechanism 5 can therefore be prevented to improve the reliability.

Figure 20:
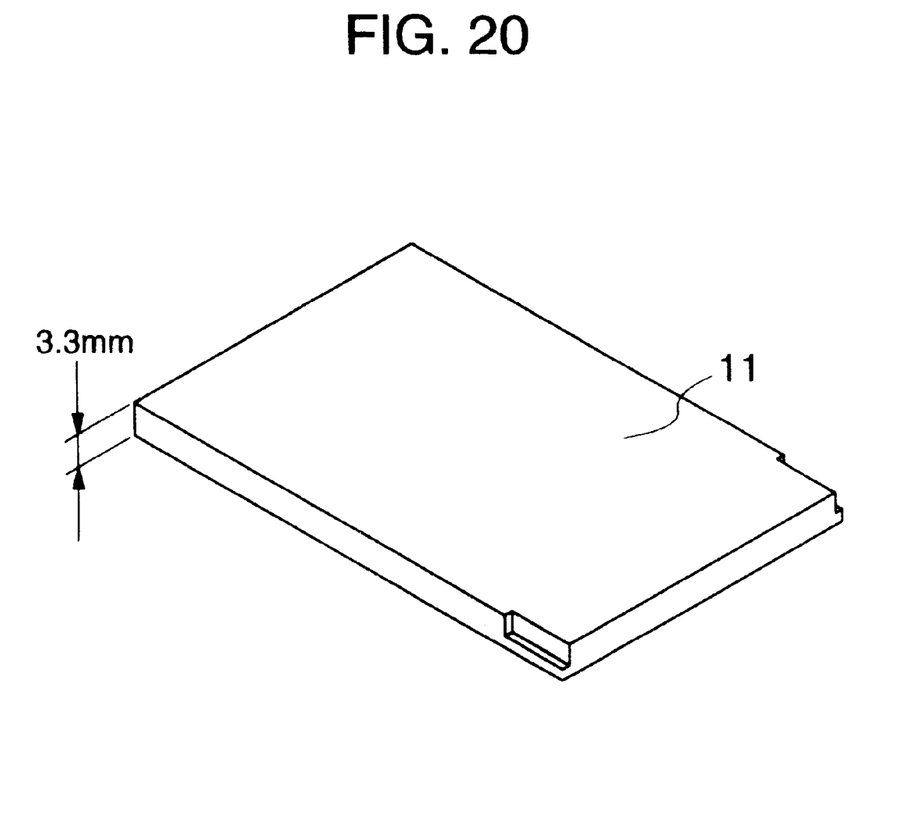
FIG. 20 is a perspective view of the outline of the magnetic disk unit according to a twelfth embodiment of the present invention.
Figure 21:
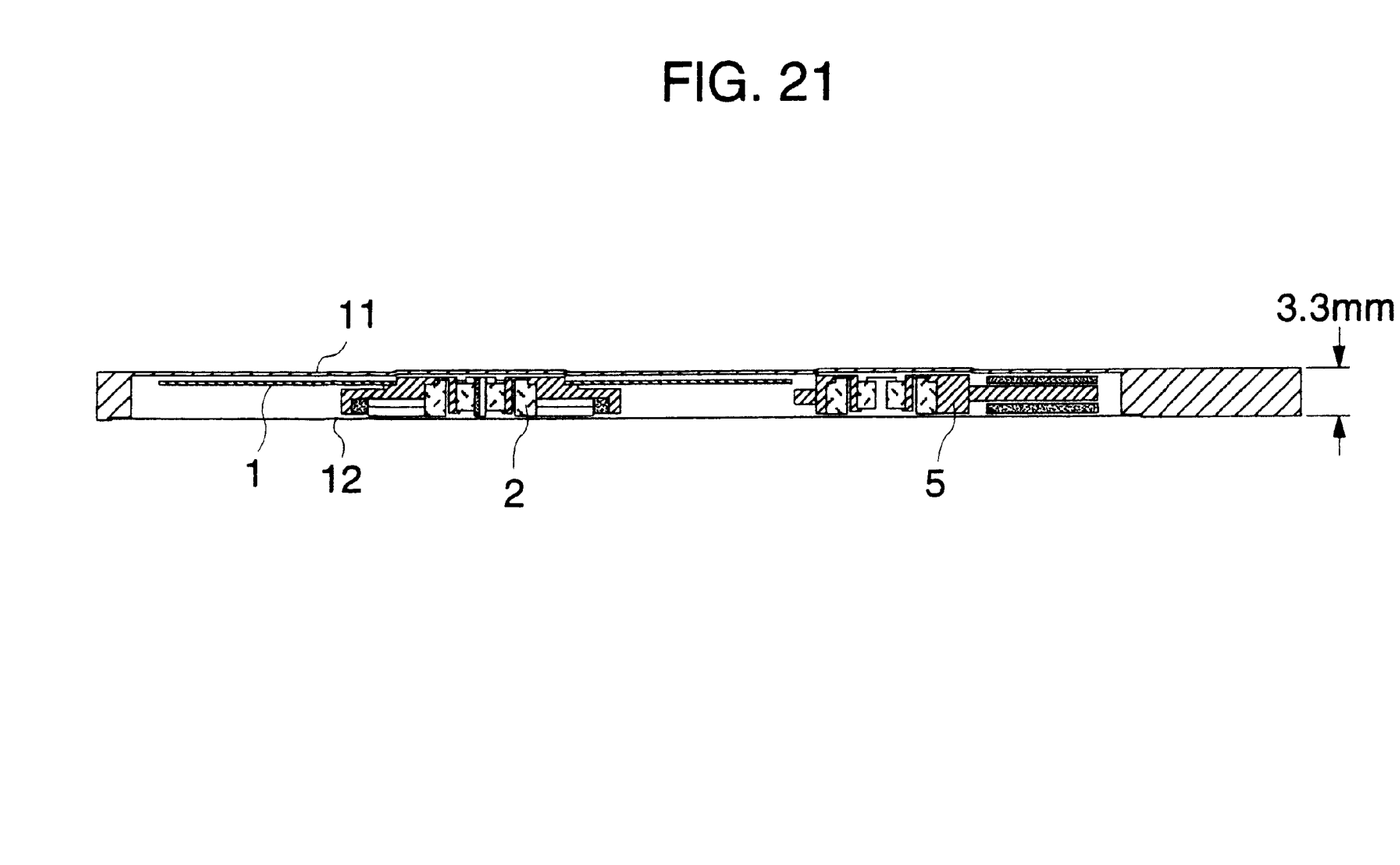
FIG. 21 is a longitudinal sectional side view of the magnetic disk unit shown in FIG. 20.

FIGS. 20 and 21 show the twelfth embodiment of the present invention. FIG. 20 is a perspective view of the outline of the magnetic disk and FIG. 21 is a longitudinal sectional side view thereof. The feature of this embodiment is that the overall dimension of the unit in the direction of its thickness is 3.3 mm or less to meet the type I standard of IC memory card. The rest of the structure remains unchanged from that of the first embodiment, so that any further description is omitted.

A magnetic disk unit of such dimension allows the prior art information processing apparatus using an IC memory card as an external memory device to be easily modified to be for use with the magnetic disk unit, whereby an information processing apparatus may be constructed so as to be compatible with both the IC memory card and the magnetic disk unit.

The above dimension may be applied to any of the first and third to eleventh embodiments already described.

In the present invention, the cover extends over the outer peripheral edge of the base that supports the spindle mechanism and the head positioning mechanism mounted thereon and the cover is connected to the base elastically to lessen the chance that an external force directly acts on the base and to cause the external force to be transmitted to the base via cushioning means, whereby the invention provides a small sized magnetic disk unit which is capable of protecting its internal mechanisms mounted on the base.

We claim:

1. A magnetic disk unit comprising a spindle mechanism for rotating a magnetic disk, a head positioning mechanism for positioning a magnetic head by shifting said magnetic head along a recording surface of said magnetic disk, a base supporting said spindle mechanism and said head positioning mechanism, and an impact cover that covers in a non-contacting relationship said spindle mechanism and said head positioning mechanism supported on said base, wherein said base includes an oblong base plate and a base retaining plate for restraining said base plate, a joint portion of said base plate and said base retaining plate contains a cushioning material therein wherein said base retaining plate extends to a lower edge portion of said impact cover and is fitted into and connected to said impact cover in an inner portion of said impact cover, and said base retaining plate is provided with openings defining plastically deformable base portions which are plastically deformed so as to engage portions of said impact cover to lock said base retaining plate and said impact cover together.

2. The magnetic disk unit according to claim 1, wherein an overall thickness of the unit is not greater than 10.5 mm.

3. The magnetic disk unit according to claim 1, wherein an overall thickness of the unit is not greater than 3.3 mm.

4. The magnetic disk unit according to claim 1, wherein at least one of said impact cover and said base retaining plate is provided with a viewing window to observe said magnetic disk and said head positioning mechanism from outside.

5. The magnetic disk unit according to claim 1, further comprising a seal connected to both said impact cover and said base to seal the joint portion therebetween.

6. A magnetic disk unit comprising a spindle mechanism for rotating a magnetic disk, a head positioning mechanism for positioning a magnetic head by shifting said magnetic head along a recording surface of said magnetic disk, a base supporting said spindle mechanism and said head positioning mechanism, and an impact cover that covers in a non-contacting relationship said spindle mechanism and said head positioning mechanism supported on said base, wherein said base includes an oblong base plate and a base retaining plate for restraining said base plate, a joint portion of said base plate and said base retaining plate contains a cushioning material therein, wherein said base retaining plate extends to a lower edge portion of said impact cover, said impact cover extends downward to have a lip substantially flush with a level of an underside of said base cover to cover an outer peripheral edge of said base cover in order to provide impact protection thereto, said base retaining plate is fitted into and connected to said impact cover in an inner portion of said impact cover, and said base retaining plate is provided with openings defining plastically deformable base portions which are plastically deformed so as to engage portions of said impact cover to lock said base retaining plate and said impact cover together.

7. The magnetic disk unit according to claim 6, wherein an overall thickness of the unit is not greater than 10.5 mm.

8. The magnetic disk unit according to claim 6, wherein an overall thickness of the unit is not greater than 3.3 mm.

9. The magnetic disk unit according to claim 6, wherein at least one of said impact cover and said base retaining plate is provided with a viewing window to observe said magnetic disk and said head positioning mechanism from outside.

10. The magnetic disk unit according to claim 6, further comprising a seal connected to both said impact cover and said base to seal the joint portion therebetween.

11. A magnetic disk unit comprising a spindle mechanism for rotating a magnetic disk, a head positioning mechanism for positioning a magnetic head by shifting said magnetic head along a recording surface of said magnetic disk, a base supporting said spindle mechanism and said head positioning mechanism, and an impact cover that covers in a non-contacting relationship said spindle mechanism and said head positioning mechanism supported on said base, wherein said base includes an oblong base plate and a base retaining plate for restraining said base plate, a joint portion of said base plate and said base retaining plate contains a cushioning material therein, wherein said base retaining plate extends to a lower edge portion of said impact cover, said impact cover extends downward beyond a level of an underside of said base cover to cover an outer peripheral edge of said base cover in order to provide impact protection thereto, said base retaining plate is fitted into and connected to said impact cover in an inner portion of said impact cover, and said base retaining plate is provided with openings defining plastically deformable base portions which are plastically deformed so as to engage portions of said impact cover to lock said base retaining plate and said impact cover together.

12. The magnetic disk unit according to claim 11, wherein an overall thickness of the unit is not greater than 10.5 mm.

13. The magnetic disk unit according to claim 11, wherein an overall thickness of the unit is not greater than 3.3 mm.

14. The magnetic disk unit according to claim 11, wherein at least one of said impact cover and said base retaining plate is provided with a viewing window to observe said magnetic disk and said head positioning mechanism from outside.

15. The magnetic disk unit according to claim 11, further comprising a seal connected to both said impact cover and said base to seal the joint portion therebetween.

\* \* \* \* \*